(12) United States Patent
Platonov et al.

(10) Patent No.: US 7,889,193 B2
(45) Date of Patent: Feb. 15, 2011

(54) METHOD OF AND SYSTEM FOR DETERMINING A DATA MODEL DESIGNED FOR BEING SUPERPOSED WITH AN IMAGE OF A REAL OBJECT IN AN OBJECT TRACKING PROCESS

(75) Inventors: Juri Platonov, Munich (DE); Marion Langer, Braunschweig (DE)

(73) Assignee: Metaio GmbH, Munich (DE)

( * ) Notice: Subject to any disclaimer, the term of this patent is extended or adjusted under 35 U.S.C. 154(b) by 793 days.

(21) Appl. No.: 11/668,495

(22) Filed: Jan. 30, 2007

(65) Prior Publication Data
US 2007/0182739 A1    Aug. 9, 2007

(30) Foreign Application Priority Data
Feb. 3, 2006 (DE) ............. 10 2006 005 044
Nov. 27, 2006 (DE) ............ 10 2006 055 893

(51) Int. Cl.
G06T 15/00 (2006.01)
G06T 15/10 (2006.01)
(52) U.S. Cl. ..................... 345/419; 345/427
(58) Field of Classification Search ........... 345/419, 345/420, 633, 427; 382/154
See application file for complete search history.

(56) References Cited

U.S. PATENT DOCUMENTS

| | | | |
|---|---|---|---|
| 6,304,263 B1 * | 10/2001 | Chiabrera et al. | 345/419 |
| 2003/0058242 A1 * | 3/2003 | Redlich | 345/427 |
| 2003/0107568 A1 * | 6/2003 | Urisaka et al. | 345/419 |
| 2005/0212811 A1 * | 9/2005 | Hashima et al. | 345/582 |
| 2006/0033733 A1 * | 2/2006 | Urisaka et al. | 345/419 |
| 2006/0140473 A1 * | 6/2006 | Brooksby et al. | 382/154 |
| 2007/0031064 A1 * | 2/2007 | Zhao et al. | 382/285 |

FOREIGN PATENT DOCUMENTS

JP    07-098765    4/1995

(Continued)

OTHER PUBLICATIONS

M. Pauly, R. Keiser, and M. Gross. "Multi-scale Feature Extraction on Point Sampled Surfaces," Nov. 4, 2003, Computer Graphics Forum, vol. 22, Issue 3, pp. 281-289.*

(Continued)

Primary Examiner—Ryan R Yang
(74) Attorney, Agent, or Firm—ARC IP Law, PC; Joseph J. Mayo

(57) ABSTRACT

A data model which is designed for being superposed with an image of a real object in an optical object tracking process is determined by the following steps: providing a three-dimensional CAD model (10) for representing the real object, and thereafter there are different synthetic two-dimensional views (31 to 34) of said CAD model (10) generated. Each generated view (31 to 34) is subjected to edge extraction for determining at least one extracted edge (38, 39) in the respective view, with the edges (38, 39) extracted from said respective views (31 to 34) being transformed to a three-dimensional contour model (85, 91) corresponding to said data model to be determined. Permits rapid and efficient generation of a contour model as a data model intended for being superposed with an image of a real object.

24 Claims, 7 Drawing Sheets

FOREIGN PATENT DOCUMENTS

| | | |
|---|---|---|
| JP | 09-050540 | 2/1997 |
| JP | 2003-141569 | 5/2003 |
| JP | 2004-280428 | 10/2004 |
| JP | 2005-050036 | 2/2005 |
| JP | 2005-267554 | 9/2005 |
| WO | WO 2005081191 A1 * | 9/2005 |

OTHER PUBLICATIONS

Yang Liu; Huaiping Yang; Wenping Wang, "Reconstructing B-spline Curves from Point Clouds—A Tangential Flow Approach Using Least Squares Minimization," Jun. 13-17, 2005, Shape Modeling and Applications, 2005 International Conference , pp. 4-12.*

Zhang, Z. "Iterative point matching for registration of free-form curves and surfaces," Oct. 1994, Int. J. Comput. Vision 13, 2, pp. 119-152.*

Wuest, H., Vial, F., and Stricker, D. "Adaptive Line Tracking with Multiple Hypotheses for Augmented Reality," Oct. 5-8, 2005, Proceedings of the 4th IEEE/ACM international Symposium on Mixed and Augmented Reality, pp. 62-69.*

Toshiyuki Adachi, et al. "Self-Location Estimation of a Moving Camera Using Edge Information of Known Environment", p. 31, (Sep. 2005).

Japanese Office Action for dated Jan. 12, 2010, 3 pages, No English translation.

Kang et al., "An Object Tracking Method with Tracking of Straight Edges and Feature Points", Abstract, 1 page, 2009.

Watanabe et al. "Global Restoration of Topographic Contour Image by Using Extended Voronoi Diagram" 1998, Abstract, 1 page.

Development of a Real Time Image Based Object Recognition Method for Mobile AR-Devices, 2003.

Multi-View Geometry for Image-Based Modeling, Aug. 8, 2004.

* cited by examiner

METHOD OF AND SYSTEM FOR DETERMINING A DATA MODEL DESIGNED FOR BEING SUPERPOSED WITH AN IMAGE OF A REAL OBJECT IN AN OBJECT TRACKING PROCESS

This application claims priority to German Patent Application Serial No. DE 10 2006 005 044.4 filed 3 Feb. 2006 and to German Patent Application Serial No. DE 10 2006 055 893.6 filed 27 Nov. 2006, the specifications of which are both hereby incorporated herein by reference.

BACKGROUND OF THE INVENTION

1. Field of the Invention

Embodiments of the invention described herein pertain to the field of computer systems and methods. More particularly, but not by way of limitation, one or more embodiments of the invention enable a method of and system for determining a data model designed for being superposed with an image of a real object in an object tracking process.

2. Description of the Related Art

Augmented Reality Systems permit the superposition of computer-generated virtual information with visual impressions of the real environment. To this end, the visual impressions of the real world are mixed with virtual information, e.g. by means of semi-transmissive data glasses worn on the head of a user. The blending-in of virtual information or objects can be effected in context-dependent manner, i.e. matched to and derived from the respective environment viewed. As virtual information, it is basically possible to use any type of data, such as texts, images etc. The real environment is detected e.g. with the aid of a camera carried on the head of the user.

When the person using an augmented reality system turns his or her head, tracking of all virtual objects is necessary with respect to the changing field of view. The real environment may be a complex apparatus, and the object detected can be a significant member of the apparatus. During an ensuing, so-called tracking operation, which represents the working process proper of the object tracking operation, while context-dependent information is blended-in in a display device for the user of the system at a desired location with respect to the real environment, the real object detected during initialization serves as a reference for computing the position at which the virtual information is to be displayed or blended-in in an image or picture taken up by the camera. Due to the fact that the user may change his or her position and orientation, the real object has to be subjected to continuous tracking in order to display the virtual information at the correct position in the display device also in case of an altered position and/or altered orientation of the user. The effect achieved thereby is that the information, irrespective of the position and/or orientation of the user, is displayed in the display device in context-correct manner with respect to reality. An augmented reality system in this regard is an example of the utilization of such so-called markerless tracking systems.

One of the major problems in the field of augmented reality is the determination of the head position and the head orientation of the user (pose) by means of a video camera that is rigidly joined to the head. This problem is related with, and may be converted to, the problem of object tracking which, as described hereinbefore, is concerned with the determination of the pose of an object with respect to the video camera, using only the video flow or image flow of the video camera as source of information.

To solve this problem, one method has turned out to be particularly promising in practical application, which is known as so-called contour-based object tracking. In this method, a so-called contour model of the real object to be tracked is compared to its image in a video representation and is matched until optimum conformity has been established (optimization). However, there are hardly investigations known so far as to how such contour models can be provided in efficient manner. In the methods of contour-based tracking known so far, such contour models are generated manually, making use of the respective real objects. Such a manual generation of a data model of virtual information, which is designed for being superposed with an image of a real object, is however comparatively complex and involves much time.

BRIEF SUMMARY OF THE INVENTION

It would be beneficial to provide a method of and a system for determining a data model of the type indicated above, which each permit rapid and efficient generation of a contour model as data model which is designed for being superposed with an image of a real object.

According to an embodiment of the invention, the data model designed for being superposed with an image of a real object is determined by way of the following steps: there is provided a three-dimensional CAD model for representing the real object, and different synthetic two-dimensional views of the CAD model are generated thereafter. Each generated view is subjected to edge extraction for determining at least one extracted edge in the respective view, and the edges extracted from the respective views are transformed to a three-dimensional contour model corresponding to the data model to be determined.

The invention in this regard provides the advantage that three-dimensional contour models, in particular for use in markerless object tracking based on three-dimensional CAD models, can be extracted in fully automatic manner. It is thus possible to provide a semi-automatic or a fully-automatic method for the generation of data models, making this technology interesting in particular for industrial applications.

An idea of the present invention lies in determining, by way of a three-dimensional CAD model for representing the respective real object, which edges of the object to be tracked are of relevance for the subsequent optical contour-based tracking, in order to transform the edges thereafter to a three-dimensional contour model. In providing the concepts of the present invention, those edges have been ascertained as relevant which can be extracted from the respective view in a large number of different views making use of an edge filter. For determining the relevant visual edges of the real object to be tracked, different views of the object to be tracked are simulated synthetically. To this end, the three-dimensional CAD model is used. The synthetic generation of different views in this respect is to be regarded as an essential element of the invention, as the necessity of providing and using video images of the real object is dispensed with by this measure. In addition thereto, there is provided complete control over the virtual camera generating the different views.

According to the present invention, the technical concept thus resides in particular in the technical field of augmented reality systems in which in particular the industrial use of such a system as described hereinbefore is rendered possible since it is possible to provide a semi-automatic or a fully automatic method of providing contour models intended for being superposed with an image of a real object. In addition thereto, as compared to manual generation of such a data model, higher accuracy is obtained on the basis of the CAD model which as a result will lead to an improved and more exact tracking method when the augmented reality system is used. An idea of the invention consists in determining, by way of the CAD model, which edges of the object to be tracked are of relevance to the subsequent optical contour-based tracking, in order to transform the same thereafter to a three-dimensional contour model. This idea has been created on the basis of the knowledge of the optical-technical relationships in implementing optical contour-based tracking, and on the basis of the corresponding technical findings an assessment has been made of the optical-technical relevance of the individual features and how these can contribute in solving the afore-mentioned technical problem.

Thus, the invention provides for the possibility of making contour-based optical object tracking an interesting approach for industrial application and thus for everyday practical application.

In accordance with the concept of the present invention, the CAD model is not used directly for optical contour-based tracking, but rather it is determined by way of the intermediate step of generating different synthetic two-dimensional views of the CAD model which edges of the real object to be tracked are of relevance to the subsequent optical contour-based tracking process. The edges extracted from the respective views are transformed to a three-dimensional contour model which can be used as data model for optical contour-based tracking.

In accordance with an embodiment of the present invention, the edge extraction is followed by the extraction of respective two-dimensional edge points, e.g. in the form of edge pixels, of an extracted edge. In transforming the extracted edges, a three-dimensional position of the respective edge points is determined with the aid of the CAD model, obtaining a quantity or set of three-dimensional points from which the three-dimensional contour model will be determined. In this regard, each edge point is understood or detected as a two-dimensional point in the image plane, and the three-dimensional position of the same in the coordinate system of the CAD model is determined.

According to a further embodiment, the three-dimensional positions of the edge points are stored in a data structure permitting inquiries with respect to the spatial proximity of three-dimensional points, with the data structure being in particular in the form of a k-d tree.

In the event that it is ascertained upon determination of a three-dimensional position of an edge point that a three-dimensional point is already present at this three-dimensional position, a further embodiment provides for incrementation of this three-dimensional point by means of a counter or count value. The operation proceeds in this manner until e.g. the desired number of synthetic view has been generated and processed. As a result, one obtains a three-dimensional point cloud, in which each three-dimensional point has a value associated therewith which indicates how many times the three-dimensional point has been rated as belonging to a visual edge. This value may also be interpreted as probability with which the respective three-dimensional point belongs to a relevant visual edge.

Edge points belonging semantically to a same three-dimensional position in space are preferably stored as one three-dimensional point, with each edge point mapped on this three-dimensional position leading to the result that a corresponding count value is incremented, thus increasing the value of the associated probability.

For recognizing in particular the fact that an edge point semantically belongs to the same three-dimensional position, an inquiry is started for each edge point after determination of the three-dimensional position of the same, said inquiry determining whether there is already at least one stored three-dimensional point in the immediate vicinity. The immediate vicinity may be defined by means of a threshold value. When there is at least one stored three-dimensional point in the immediate vicinity, there is no new three-dimensional point stored, but the count value of the already stored three-dimensional point is incremented.

If a thus determined probability distribution with respect to visual relevance has been obtained, it is possible with the aid of a threshold value to discard a three-dimensional point the associated probability value of which is below the threshold value, with remaining three-dimensional points presenting visually relevant contours of the real object. In particular, the quantity or set of three-dimensional points is reduced to regions which represent, with high probability, relevant contours of the real object for a subsequent tracking process in the augmented reality system. In this regard, three-dimensional points with an associated probability below a specific threshold value, in particular of the associated count value thereof, are discarded.

According to another embodiment of the invention, the set of three-dimensional points then is divided into joined contour segments, using in particular an algorithm by means of which an Euclidean minimum spanning tree of the three-dimensional points is determined.

In particular, at least part of the three-dimensional points in the contour segments is replaced by a suitable contour representation which is approximated using an optimization method e.g. with the aid of lines, B splines, Bezier splines or NURBS. For example, a contour segment can be approximated using a sequence of line segments until a predetermined accuracy has been obtained. In addition to as an alternative to curved contour segments, e.g. an optimization method with B splines is utilized.

After determination of the three-dimensional contour model in accordance with the method of the invention, an optical object tracking method may be carried out using such a contour model. In this regard, the contour model, as a data model of virtual information, has an image of a real object superposed therewith on an image plane. To this end, a camera takes a two-dimensional image or picture including at least the real object. Furthermore, an optimization method is carried out in which the data model is projected to the image plane so as to superpose the image of the real object on the image plane on a projection of the data model.

During the tracking operation, there is carried out in particular a comparison between the projection of the data model and the image of the real object, with parameters of the camera pose being determined on the basis of the comparison result. The information thus obtained serves as reference for computing the position at which the virtual information is to be displayed or blended-in in an image taken up by the camera. Continuous tracking of the real object is performed when the user or the camera changes position and/or orientation. After determination of the camera parameters for determining the position and orientation of the camera with respect to the real object, the delineative parameter values of the data-technical model are defined so that the internal computer model corresponds to the physical world.

Furthermore, the present invention relates to a corresponding system for determining a data model, which is designed in accordance with the principles of the present invention. Such a system comprises in an embodiment a means for providing the three-dimensional CAD model and a means for generating different synthetic two-dimensional views of the CAD model. This means also is designed to subject each generated view to edge extraction so as to determine at least one extracted edge in the respective view. Furthermore, there is provided a means for transforming the edges extracted from the respective views to a three-dimensional contour model. Such means may be realized in particular in the form of a conventional computer system which is adapted such that the method steps according to the invention may be implemented in the manner described.

The method according to the invention, for example, is implemented on a computer program product, in particular a suitable memory medium or product, which may be loaded into the internal memory of a digital computer. Such a computer program product comprises software code sections by means of which the individual method steps according to the present invention, as described hereinbefore, are carried out when the product is running on the computer.

The present invention may be utilized in many fields of application making use of a tracking system or a tracking method. Such applications are in particular the augmented reality technology in the fields of service and maintenance, applications in production environments as well as general applications in mobile environments. In particular, the invention can also be utilized in the field of industrial production in which industrial machines, such as industrial robots, are automatically controlled or governed with respect to the real environment taken up.

Further embodiments of the invention are set forth in the dependent claims.

BRIEF DESCRIPTION OF THE DRAWINGS

The invention will be discussed in more detail in the following by way of the figures illustrating embodiments of the invention, in which.

DETAILED DESCRIPTION OF THE INVENTION

Figure 1:
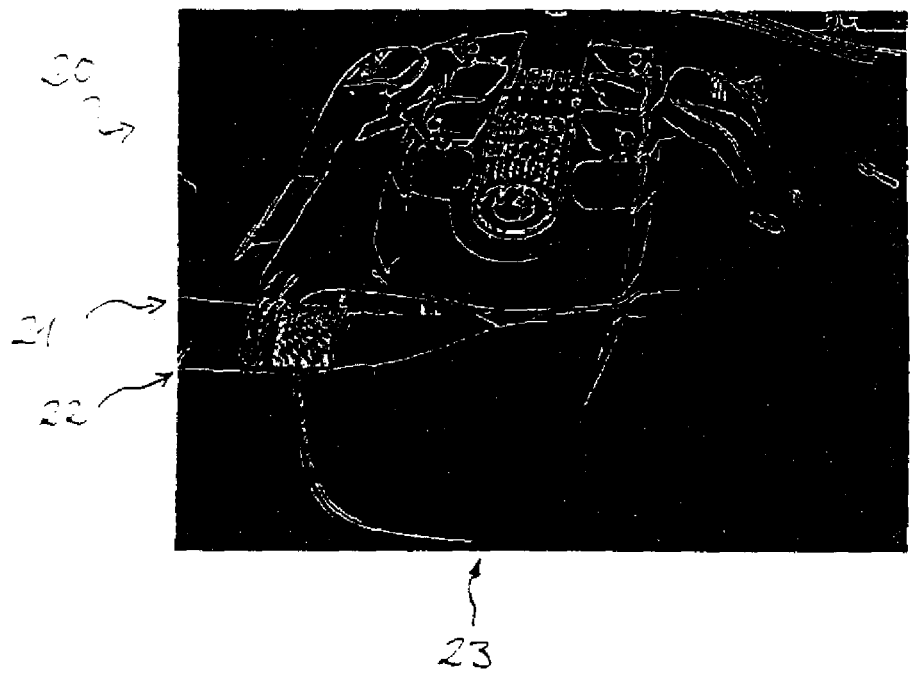
FIG. 1 shows a view of visual edges belonging to an object taken up, and extracted by means of an edge filter.

In accordance with principles of the present invention, it is determined with the aid of a three-dimensional CAD model which edges of a real object to be tracked are of relevance in a subsequent optical contour-based tracking method, in order to transform these edges then to a three-dimensional contour model. Of relevance in this context are to be regarded those edges that can be extracted from the image in an as large as possible number of views by means of an edge filter, e.g. according to Sobel or Canny. In this context, FIG. 1 shows a view of visual edges belonging to a real object as taken up by a camera, which have been extracted using such an edge filter. In particular, the edges have been extracted using a Canny edge filter. The extracted edges are shown as white lines marking a transition between light-dark and dark-light, respectively, in the real object. In the view 20 illustrated in FIG. 1, exemplary visual edges bear reference numerals 21 to 23.

Figure 2:
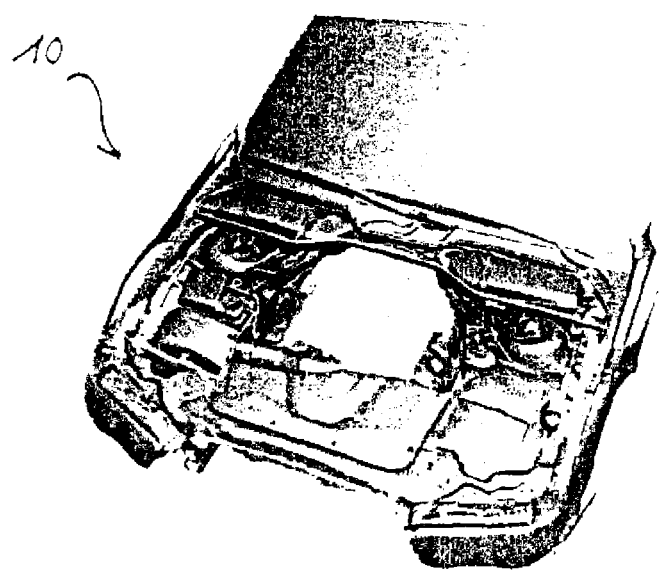
FIG. 2 shows a three-dimensional CAD model for representing a real object in the form of an engine compartment of a vehicle.

For determining relevant visual edges for producing a three-dimensional contour model, the present invention makes use of a synthetic simulation of various views of the real object to be tracked. To this end, there is employed a three-dimensional CAD model as exemplified in FIG. 2 by way of a concrete embodiment. FIG. 2 shows an exemplary three-dimensional CAD model 10 representing the engine compartment of a vehicle. By way of the synthetic generation of different views in accordance with the invention, it is possible to dispense with the necessity of using video images of the real object in order to manually provide a three-dimensional contour model for the subsequent optical tracking process. For generating the synthetic views, the CAD model shall represent the real object as accurately as possible. The use of textured CAD models is advantageous for obtaining therefrom a sufficient quantity of contours, but this is not cogently required in case of complex geometries. A relatively complex geometry is presented e.g. by the CAD model according to FIG. 2.

Figure 3:
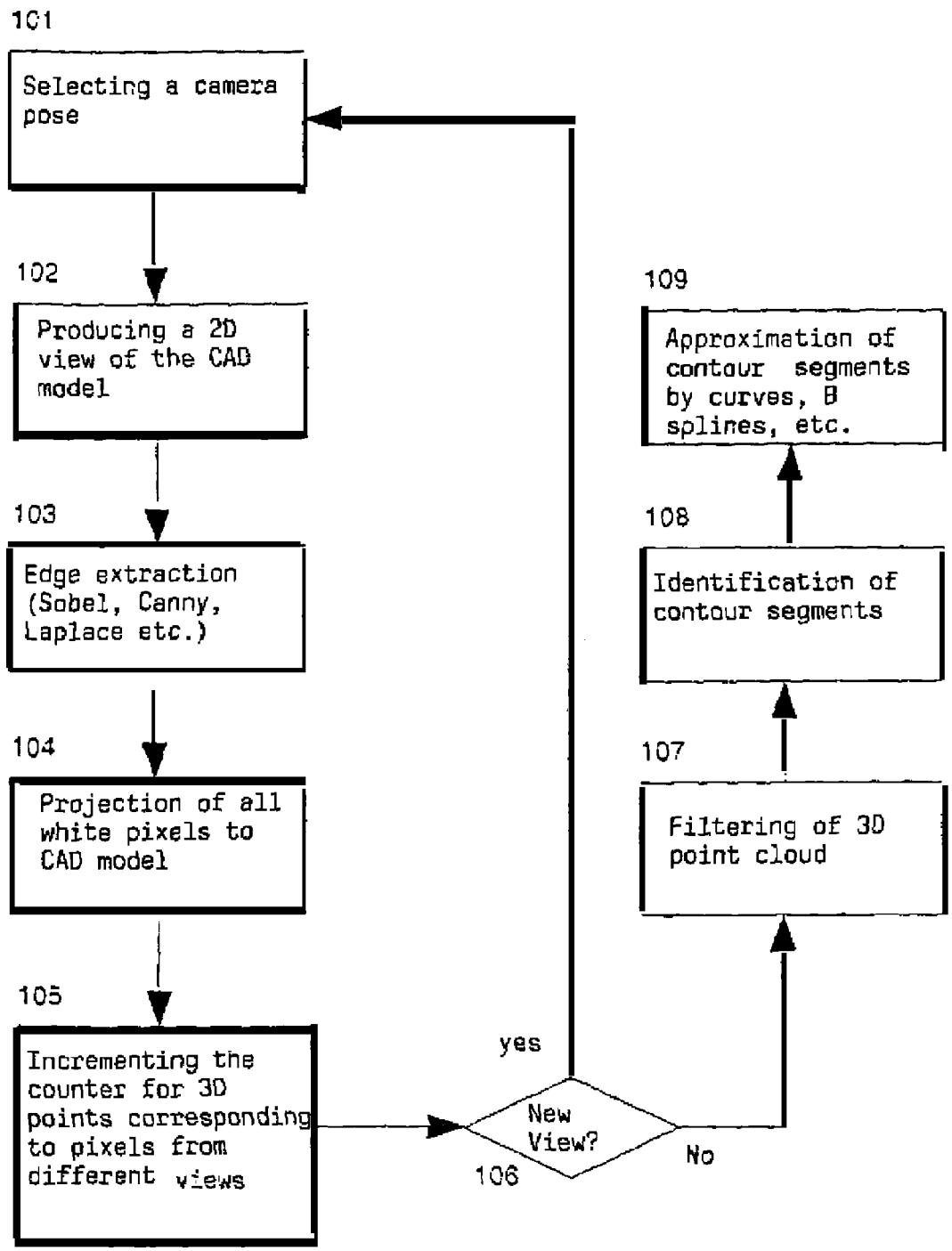
FIG. 3 shows a flow chart of an embodiment of a method according to the invention.

FIG. 3 shows a flow diagram concerning an embodiment of a method according to the invention. This diagram will be elucidated in more detail hereinafter in connection with the following FIGS. 4 to 9.

Figure 4:
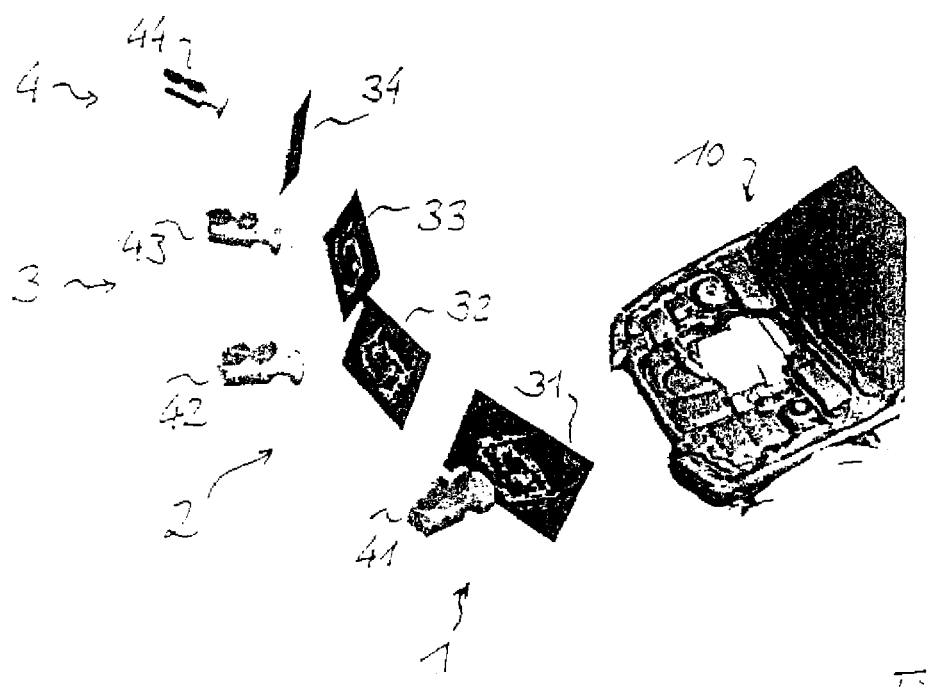
FIG. 4 shows a schematic visualization concerning the generation of different synthetic two-dimensional views of the CAD model.

FIG. 4 firstly shows a schematic visualization concerning the generation of different synthetic two-dimensional views of the CAD model. In step 101 of FIG. 3, there is first selected a camera pose of a virtual camera, e.g. camera 41 according to FIG. 4. In pose 1, virtual camera 41 generates a 2D view 31 of CAD model 10. In pose 2, virtual camera 42 generates a 2D view 32 of CAD model 10. In corresponding manner, a 2D view 33 and 34, respectively, of CAD model 10 is generated in poses 3 and 4 of virtual cameras 43 and 44, respectively. The positioning of the respective virtual camera may be effected either uniformly in a range defined by the user, or in accordance with a prior probability distribution. The utilization of such a probability distribution will be explained in more detail later on.

Figure 5:
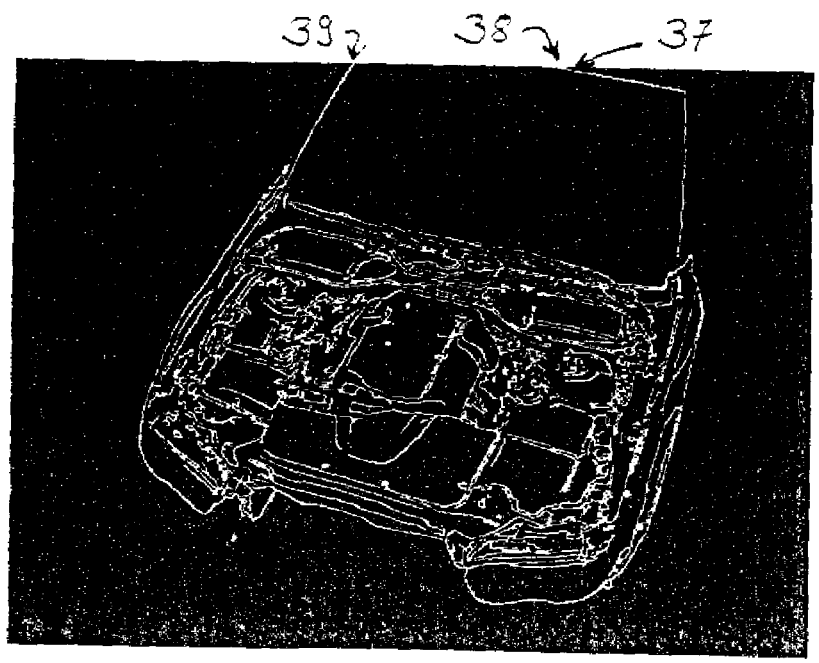
FIG. 5 shows exemplary two-dimensional edges extracted from a synthetic view.

Every view 31 to 34 that is synthetically generated in this manner is subjected to edge extraction. In this regard, a known Sobel or Canny edge filter may be used. It is recommendable to make use of the same edge extractor that possibly will be used later on during tracking. FIG. 5 illustrates the edges extracted from the synthetic view of the CAD model in FIG. 2 using a Canny edge detector. It can be seen that the extracted edges appear white on a black background.

For determining the visually relevant edges of an object, the possibly textured CAD model is repeatedly rendered from different views, in which e.g. a number of more than 1000 views is generated. The technical term "rendering" in this context describes the process of generating an image of a virtual three-dimensional data model. The number of the different views is defined here in step 106 by way of an inquiry. This means that steps 101 to 105 are carried out consecutively for each view to be generated anew.

The 2D views created in step 102 should be as similar as possible to the real object. Due to the fact that the light conditions and in particular the light direction in the scene have a significant effect on the visual edges, it is particularly advantageous to simulate different light situations. It is thus advantageous to make use of photo-realistic "rendering".

In step 103, the two-dimensional edges (2D edges) of the photo-realistically "rendered" views of the CAD model are extracted by way of an edge extraction method (e.g. a standard method according to Sobel or Canny) and are made available for further processing in the form of binary images. In doing so, the extracted edges appear white in the image or picture, whereas all other pixels are black. This is exemplified in FIG. 5 in the form of view 30 in which exemplary visual extracted edges are indicated at 38 and 39. For example, edge 38 comprises a multiplicity of edge pixels 37 appearing in white.

Figure 6:
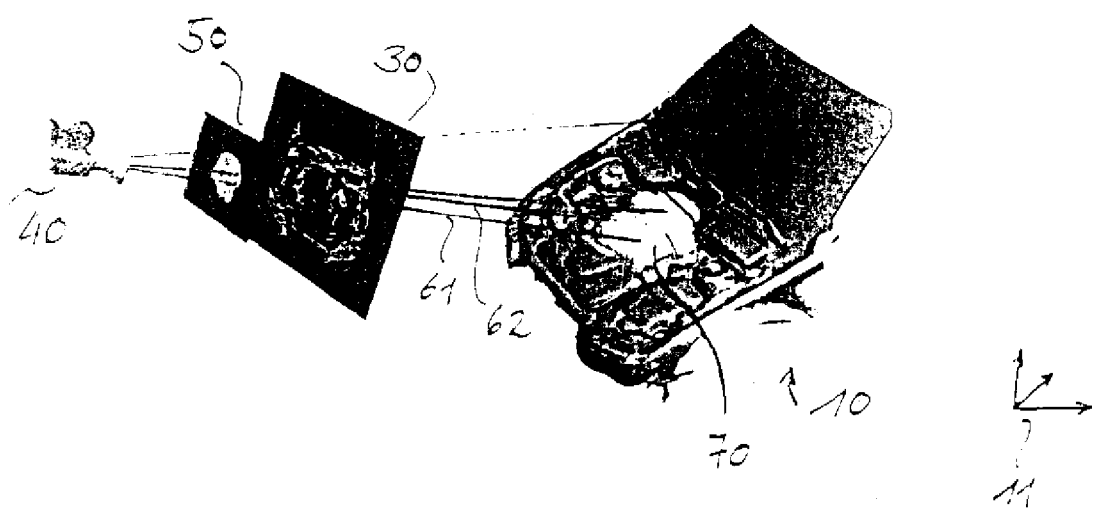
FIG. 6 shows a schematic visualization of a method step according to which an associated three-dimensional position is determined for each two-dimensional edge pixel.

After edge extraction, each edge pixel appearing in white in the image is understood or detected as a two-dimensional point (2D point), and the three-dimensional position (3D position) of the same in the coordinate system of the CAD model (designated 11 in FIG. 6) is determined. For determining the relevant edge contours, it is necessary to compute for each 2D edge pixel the associated 3D position of the same. FIG. 6 shows a schematic visualization of a method step according to which the related 3D position is determined for each 2D edge pixel. A virtual camera in this regard bears reference numeral 40 and generates from this CAD model 10 a two-dimensional view 30 as illustrated in FIG. 5.

The present embodiment furthermore makes use of a color coding model 50. To this end, there is rendered for each photo-realistic view of the CAD model 10 (e.g. for views 31 to 34 according to FIG. 4) a pseudo color view in which each face of the CAD model has an unequivocal color assigned thereto. The faces for example are triangles of a polygonal model describing the surface of an object by three-dimensional points in space and by connections between these points. For each edge pixel, one retrieves the color value at the same 2D position in the pseudo color image and uses this value as an index for efficiently accessing the corresponding face (triangle) of the CAD model. This triangle spans a plane in 3D space. The sought 3D position 70 of a 2D edge pixel is the point of intersection of the plane with the beam (e.g. beam 61 or 62) connecting the camera center of camera 40 to the respective 2D pixel. In color coding of the "faces" of the CAD model, it is not necessary to test the collision with other "faces" of the CAD model, but only the point of penetration at the location where the color of the mapped CAD model corresponds to the face color code of the CAD model.

The thus determined 3D positions of the edge pixels are stored in a data structure permitting efficient inquiries with respect to the spatial neighborhood of 3D points, e.g. by means of a k-d tree. The re-projection of the 2D edges to three-dimensional space, illustrated by way of FIG. 6, is carried out in step 104 of FIG. 3.

A two-dimensional edge may be visible in several views (e.g. views 31 to 34 according to FIG. 4), as especially in that case it represents a relevant visual edge. This means that the same 3D position may be assigned to several 2D edge pixels originating from different views. Edge pixels semantically belonging to the same 3D projection in space are stored as one 3D point, with each edge pixel mapped to this 3D position having the effect that a corresponding counter or count value is incremented (step 105 of FIG. 3). In other words, if it is noted after determination of the 3D position of an edge pixel that a 3D point is already present at this 3D position, a count value is incremented for this 3D point.

Due to numerical inaccuracies, the 3D positions presumably will not be exactly identical, but will slightly deviate from each other. For recognizing the fact that a pixel semantically belongs to the same 3D point, it is necessary for each 2D edge pixel, after determination of the 3D position of the same, to start an inquiry as to whether there are already stored 3D points in the immediate vicinity. If this is so, no new 3D point will be stored, but rather the count value of the already existing 3D point is incremented. "Immediate vicinity" is defined by means of a threshold value. A data structure permitting an efficient realization of such inquiries is the aforementioned k-d tree.

In this manner one now proceeds with steps 101 to 104 until the desired number of synthetic views has been generated and processed. The result of this process is a cloud of 3D points, with each 3D point having a value associated therewith which indicates how many times the 3D point has been rated as belonging to one visual edge. This value may also be interpreted as a probability with which the respective 3D point belongs to a relevant visual edge. Thus, there is formed a probability distribution with respect to the virtual relevance on the surface of the CAD model. By way of a threshold value, it is then possible to discard or reject all 3D points having a too low probability as regards the belonging thereof to a relevant visual edge. The remaining 3D points thus represent the visually relevant contours of a real object to be tracked.

After all synthetic views have been produced and corresponding 3D positions have been determined for all 2D edge pixels, the thus created 3D point cloud is reduced in particular to regions representing with high probability the contours relevant for tracking. This task can be implemented with the aid of a simple threshold method so that all 3D points with count values (probabilities) below a specific threshold value are discarded (step 107 in FIG. 3).

Figure 7:
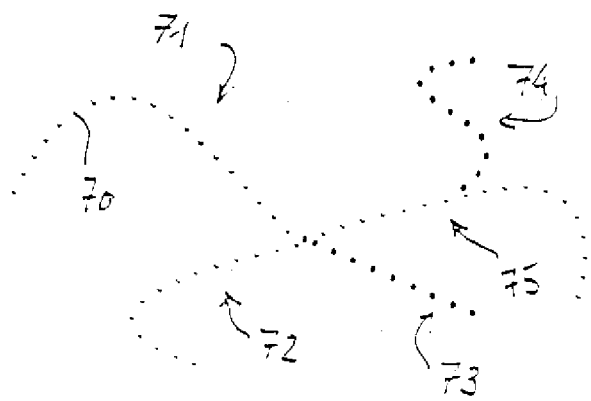
FIG. 7 shows an example of a possible division of a plain three-dimensional point cloud into individual contour segments.
Figure 8:
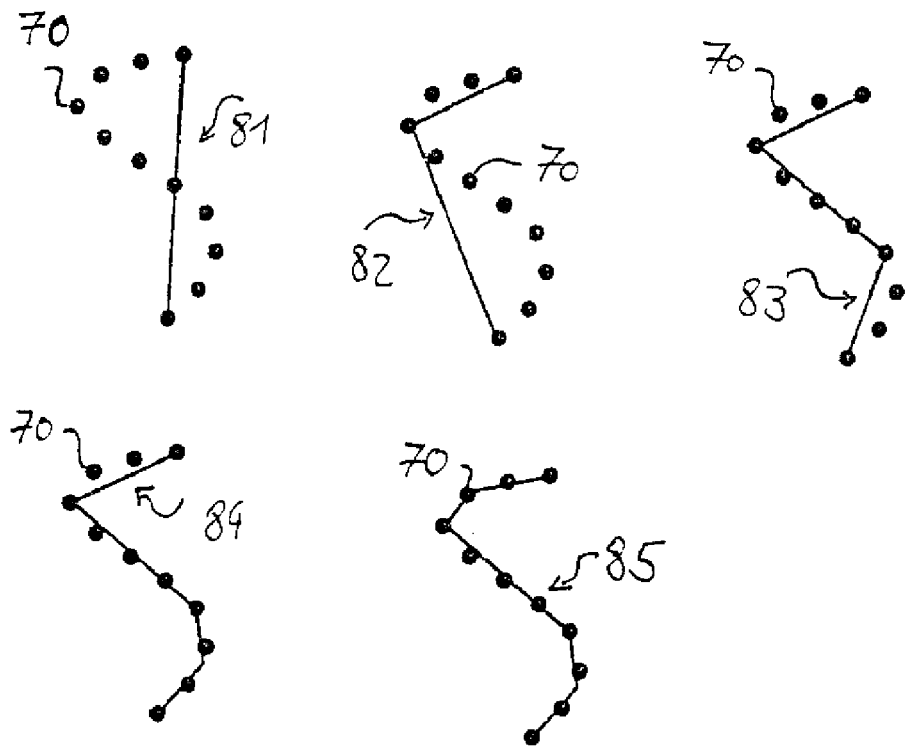
FIG. 8 shows an example of a possible approximation of a three-dimensional contour segment using lines or curves.
Figure 9:
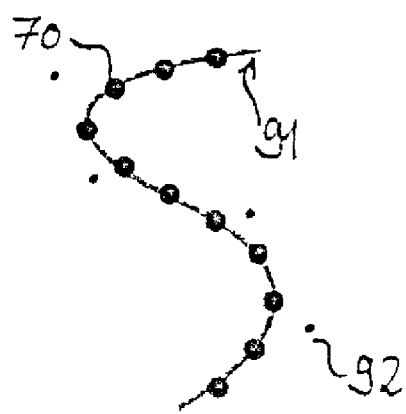
FIG. 9 shows an example of a possible approximation of a three-dimensional contour segment using B splines.

Upon generation of a 3D point cloud, representing the relevant 3D contours in the form of points, this point cloud is divided into individual contour segments. FIG. 7 illustrates an example of a possible division of a simple 3D point cloud, including 3D points 70, to individual contour segments 71 to 75. Such contour segments then may be approximated using an optimization method (e.g. Levenberg-Marquardt) with lines, B splines or NURBS in order to thus permit a compact representation of the contours. In other words, when the 3D point cloud is divided into individual contour segments, these are replaced by a corresponding contour representation. Two possible contour representations are illustrated by way of FIG. 8 and FIG. 9, with FIG. 8 showing an example of a possible approximation of a 3D contour segment using lines, and FIG. 9 showing an example of a possible approximation of a 3D segment using B splines. Other representations are feasible in this context as well, such as e.g. Bezier splines or NURBS etc.

As shown by way of FIG. 8, a contour segment may be approximated from several 3D points 70 using a sequence of line segments 81 to 85, until the desired accuracy has been obtained. A thus determined contour segment may represent a part of the contour model. As can be seen from FIG. 9, B splines permit a compact approximation of a larger set of data. This is why these are very well suited to describe a contour segment. B splines, as outlined in FIG. 9 with numeral 91, in concrete terms permit, in particular with curved contour segments, an exact approximation of the point cloud in a compact representation by means of a set of control points 92. The identification of contour segments and the approximation of contour segments by lines, B splines etc. is performed in steps 108 and 109 of FIG. 3. A thus determined contour segment, such as e.g. B spline 91, may represent a part of the contour model.

In the following, an embodiment for identifying contour segments will be described, which may be implemented in step 108 of FIG. 3.

As mentioned, filtering of the point cloud provides a filtered point cloud (FPC) which still contains only those 3D edge points that are above the selected relative threshold value (relative threshold value; dependent upon the maximum hit ratio). This FPC consists of different regions (partial clouds of points):

regions in which the points have a large distribution permitting no assignment to one edge;
regions in which the points can be assigned to several edges that are very close to each other;
regions in which the points may be well assigned to one edge (ideal situation).

Additional properties of this initial situation are as follows:

The points adapted to constitute an edge are not arranged in successive, sorted fashion in one line, but are distributed around the ideal edge and thus exhibit noise with respect to the ideal edge.

The noise of the edges may be of different intensity, i.e. the orthogonal distance of the points from their ideal edge may vary. If averaging of the points were carried out for providing the edge, a radius would have to be selected that is sufficiently large to contain all points relevant for the edge and at the same time is as small as possible to avoid points from a second edge in the vicinity to be included therein. This radius would have be variable.

In this regard, the task arising is that such points of the entire point cloud present need to be determined which each contribute in forming an edge and in a subsequent step may be approximated so as to form an edge.

Figure 10:
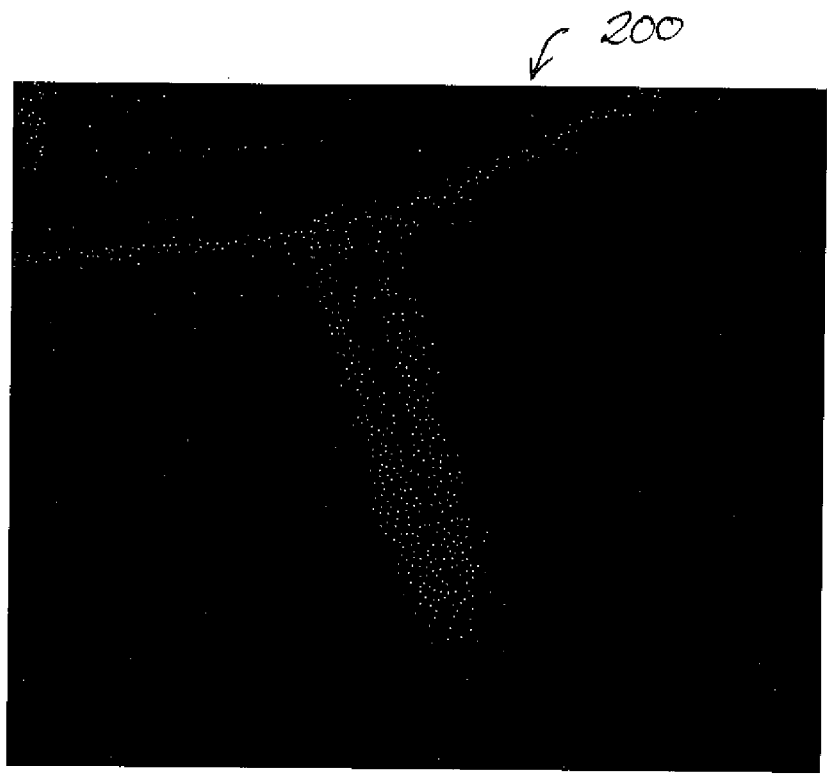
FIGS. 10 to 13 illustrate the identification of contour segments associated with edges lying closely together, using one or more Euclidean minimum spanning trees.

On the basis of this initial situation, there are arising two problems in particular, as already mentioned hereinbefore:

edges located closely together, so that points of the point cloud are very close together in the corresponding regions and have to be associated with the different edges. This is shown in FIG. 10 illustrating a filtered point cloud 200 of exemplary edges located close to each other.

Variance of the intensity of the noise, i.e. the orthogonal distance of points from their ideal edge may vary.

As a solution approach in this regard, there is preferably employed an algorithm making use of the so-called Euclidean minimum spanning tree (EMST).

For determining the EMST of the point cloud, there is first formed a graph G interconnecting all points that each have a mutual distance from each other that is smaller than or equal to the maximum acceptable noise r_max of an edge. The EMST of graph G is a tree (and thus has no cycles) interconnecting all points of the graph such that the sum of the edge length thereof is at minimum.

A preferably used algorithm for determining the EMST is the algorithm by Kruskal. Kruskal's algorithm has the property of generating a minimum spanning forest in case of an incompletely connected graph G. This property is significant as there is a high probability that the graph generated from the filtered point cloud with r_max will not be connected completely. An alternative to Kruskal's algorithm is the algorithm according to Prim, which in case of an incompletely connected graph G generates a spanning tree of one of the connected graphs.

Kruskal's algorithm makes use of the following steps in particular:

generation of a forest F (set of trees) in which each point firstly constitutes a separate tree;
generation of the set S containing all edges of graph G;
as long as S is not empty:
  remove the edge with the lowest weight (for example the shortest edge) from S;
  if that edge connects two trees, add the two trees and that edge so as to form a tree;
  otherwise discard that edge.

Figure 11:
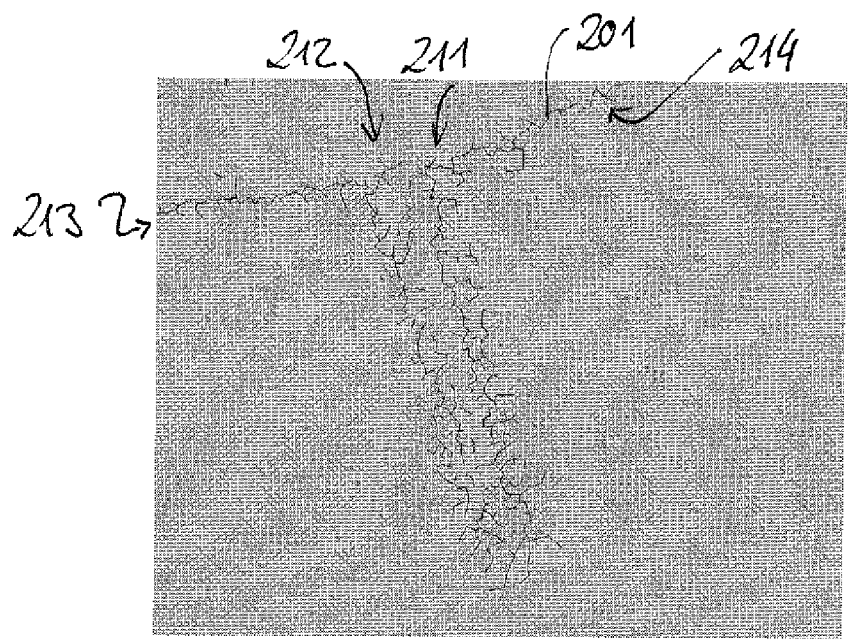

The thus formed tree is the sought EMST, e.g. the EMST 201 according to FIG. 11, which correspondingly connects several of the points determined before from the filtered point cloud of edges located closely together. The EMST 201 in this case represents an EMST of two closely adjacent edges 211 and 212 which in the present example are connected to edges 213 and 214. The EMST determines the belonging together of the points.

Figure 12:
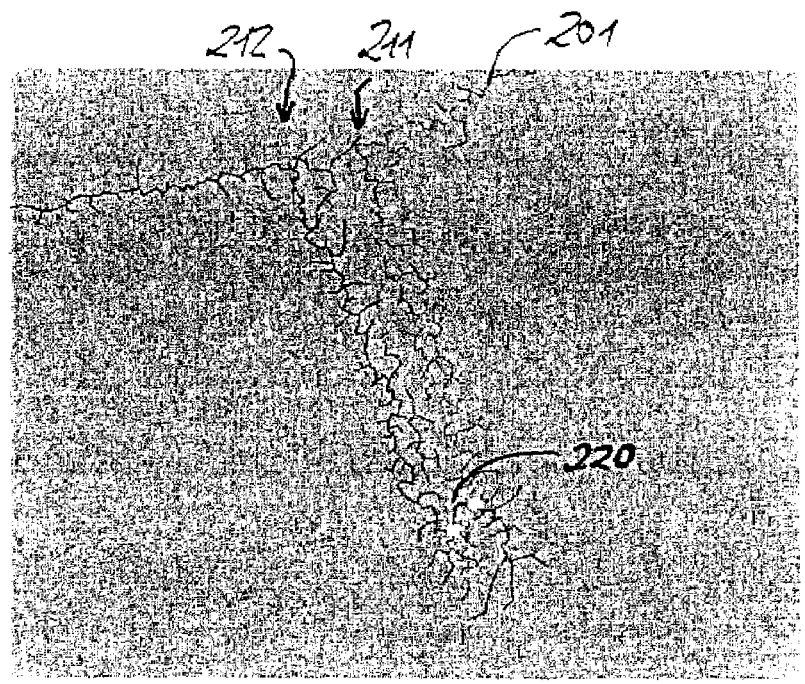
Figure 13:
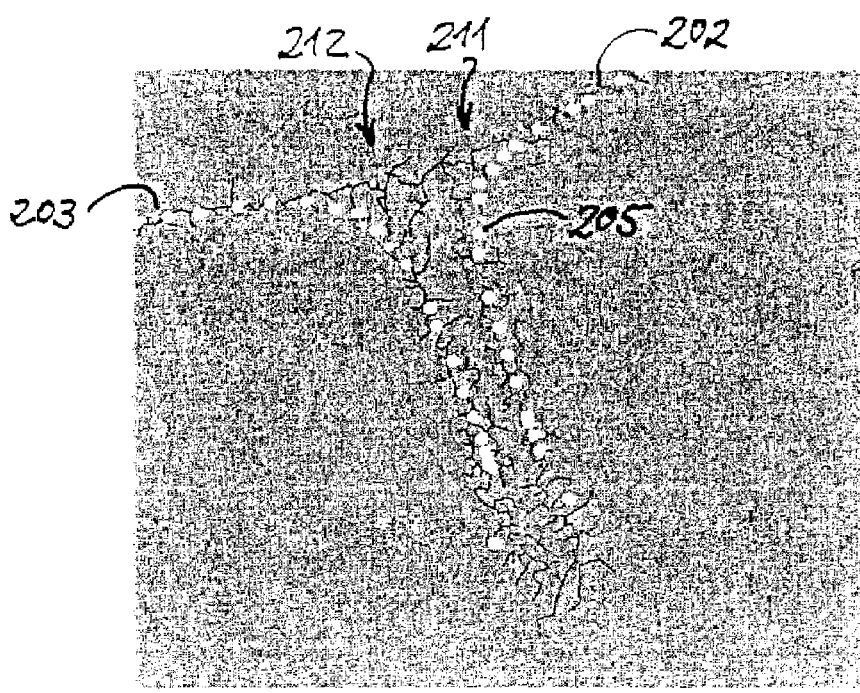

At least one location, closely adjacent edges or EMSTs will connect to each other, as shown in exemplary manner by the position or connection 220 in FIG. 12, connecting edges 211 and 212. These connections need to be determined and deleted. They constitute an erroneous connection. One thus obtains several separate EMSTs for a respective edge, which accordingly are separate. This is illustrated by way of FIG. 13 in the form of separate EMSTs 202 and 203 for edges 211 and 212, respectively.

Thereafter, the separate EMSTs may be averaged, e.g. by determining the barycenter within respective partial trees. The points thus determined, such as e.g. the barycenters 205 according to FIG. 13, can be approximated to form contour segments as described hereinbefore (step 109 in FIG. 3).

As already mentioned hereinbefore with respect to FIG. 4, the positioning of the virtual camera may take place either uniformly or in accordance with a prior probability distribution. Such a probability distribution may consider e.g. which views of the engine compartment shown are most probable from the view of a mechanic performing work in the engine compartment. In this manner it is possible to generate a probability distribution with respect to the reality. Such a probability distribution, for example, has an effect on the edge weighting so that e.g. visual edges from more probable positions will be weighted higher than visual edges visible in a view having a lower probability of occurrence with respect to reality.

The advantages of the present invention in particular consist in that fully automatic generation of contour models is made possible, smoothing the path for industrial application of contour-based object tracking methods. The invention in this regard closes the gap between comprehensive databases of CAD models as often present in heavy industry, and the contour-based algorithms for markerless object tracking.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. A method of determining a data model of virtual information to be superposed with an image of a real object in an object tracking process, said method being performed on at least one digital computer configured to implement method steps comprising:

providing a three-dimensional CAD model (10) on said at least one digital computer wherein said three-dimensional CAD model (10) represents a real object to be tracked in a subsequent object tracking process;

generating different synthetic two-dimensional views (31 to 34) from said CAD model (10) on said at least one digital computer;

subjecting each generated view (31 to 34) to edge extraction on said at least one digital computer to determine at least one extracted edge (38, 39) in a respective view and determining which edges of the real object to be tracked are of relevance for said subsequent object tracking process; and, transforming on said at least one digital computer said at least one extracted edge (38, 39) extracted from said respective view selected from said respective views (31 to 34) to a three-dimensional contour model (85, 91) corresponding to a data model.

2. The method of claim 1, further comprising:

determining subsequent to said edge extraction, respective two-dimensional edge points (37) of an extracted edge (38, 39); and, determining in said transforming said at least one extracted edge (38, 39), a three-dimensional position of said respective edge points (37) using said CAD model (10), obtaining a set of three-dimensional points (70) from which said three-dimensional contour model (85, 91) is determined.

3. The method of claim 2, further comprising:

detecting each edge point (37) as a two-dimensional point in an image plane and said three-dimensional position (70) is determined in a coordinate system (11) of said CAD model (10).

4. The method of claim 2, further comprising:

storing obtained said three-dimensional positions (70) of said respective edge points are stored in a data structure permitting inquiries with respect to a spatial proximity of three-dimensional points, said data structure being in particular in a form of a k-d tree.

5. The method of claim 2, further comprising:

incrementing a count value for said three-dimensional point if after determining said three-dimensional position (70) of an edge point it is ascertained that there is already a three-dimensional point (70) present at said three-dimensional position.

6. The method of claim 2, further comprising:

incrementing a corresponding count value when edge points (37) belonging semantically to a same three-dimensional position in space are stored as one three-dimensional point (70), with each edge point mapped on this three-dimensional position.

7. The method of claim 6, further comprising:

recognizing that an edge point semantically belongs to said same three-dimensional position wherein there is started for each edge point (37), after determination of said three-dimensional position (70), an inquiry as to whether there is at least one stored three-dimensional point (70) in an immediate vicinity and if so, there is no new three-dimensional point stored, but said corresponding count value of an already stored three-dimensional point (70) is incremented and with said immediate vicinity in this regard being determined by means of a threshold value.

8. The method of claim 2, further comprising:

associating with each three-dimensional point (70) a value which indicates how many times said three-dimensional point has been rated as belonging to one visual edge (38, 39).

9. The method of claim 8, further comprising:

discarding with aid of a threshold value, a three-dimensional point (70) having an associated value below said threshold value with remaining three-dimensional points (70) representing visually relevant contours of said real object.

10. The method of claim 2, further comprising:

reducing said set of three-dimensional points (70) to portions representing with high probability relevant contours of said real object for a subsequent tracking method in an augmented reality system; and, discarding said three-dimensional points (70) employing a threshold value method wherein said three-dimensional points (70) have an associated probability or in particular an associated count value below a specific threshold value.

11. The method of claim 2, further comprising:

dividing said set of three-dimensional points (70) into joined contour segments (71 to 75).

12. The method of claim 11, further comprising:

using an algorithm for said dividing said set of three-dimensional points (70) into joined contour segments (71 to 75), wherein said algorithm utilizes an Euclidean minimum spanning tree of said three-dimensional points.

13. The method of claim 12, further comprising:

forming a first graph for determining said Euclidean minimum spanning tree (201) of a point cloud (200), at first a graph G interconnecting all such points of said point cloud that have a mutual distance from each other that is smaller than or equal to a maximum acceptable noise r_max of an edge.

14. The method of claim 13, further comprising:

determining a tree (201) as said Euclidean minimum spanning tree of said graph G, wherein said tree (201) interconnects all points of said graph G such that a sum of their edge lengths is at minimum.

15. The method of claim 11, further comprising:

replacing at least part of said three-dimensional points (70) in said contour segments by a suitable contour representation (81 to 85; 91) which is approximated in particular with aid of an optimization method using curves, B splines, Bezier splines or NURBS.

16. The method of claim 1, wherein generating the different synthetic two-dimensional views (31 to 34) from said CAD model (10) comprises simulating different light situations.

17. The method of claim 1, further comprising:

generating a pseudo color view (50) for each two-dimensional view (31 to 34) of said CAD model (10), having individual faces, with each face having an unequivocal color assigned thereto;

retrieving a color value from said pseudo color image for each edge point at the same two-dimensional position;

accessing the corresponding face of said CAD model (10) using a determined color value that is used as an index with each face of said CAD model spanning a plane in three-dimensional space; and, determining a three-dimensional position (70) of a two-dimensional edge point being a point of intersection of said plane of said corresponding face of said CAD model (10) and of a beam (61, 62) connecting a camera center of a virtual camera (40) to said respective two-dimensional edge point.

18. The method of claim 1, wherein the edges that are of relevance are ascertained as relevant those which can be extracted from the respective view in a large number of different views.

19. The method of claim 1, wherein said subjecting each said generated view to edge extraction comprises using a same edge extractor as is used in the subsequent object tracking process.

20. The method of claim 1, wherein said generating said different synthetic two-dimensional views includes using a virtual camera in generating the synthetic two-dimensional views from different positions, wherein positioning of the virtual camera takes place in accordance with a probability distribution which considers which views of the real object are most probable from a user's view.

21. An object tracking method making use of a data model of virtual information being superposed with an image of a real object on an image plane, said method comprising the following steps:
   providing a three-dimensional CAD model (10) for representing a real object to be tracked in a subsequent object tracking process;
   generating different synthetic two-dimensional views (31 to 34) from said CAD model (10);
   subjecting each generated view (31 to 34) to edge extraction, determining at least one extracted edge (38, 39) in a respective view and determining which edges of the real object to be tracked are of relevance for said subsequent object tracking process;
   transforming said at least one extracted edge (38, 39) extracted from said respective view selected from said respective views (31 to 34) to a three-dimensional contour model (85, 91) corresponding to a data model;
   taking a two-dimensional image using a camera, said image at least including said real object; and,
   performing an optimization method projecting said data model to said image plane in order to superpose a projection of said data model with the image of said real object on said image plane.

22. The method of claim 21, comprising the following steps:
   comparing said projection of said data model to said image of said real object; and,
   determining parameters of a pose of said camera based on a comparison result.

23. A system for determining a data model of virtual information which is designed for being superposed with an image of a real object by means of an augmented reality system, comprising:
   a means for providing a three-dimensional CAD model (10) for representing the real object to be tracked in a subsequent object tracking process;
   a means for generating different synthetic two-dimensional views (31 to 34) from said CAD model (10), said means being designed furthermore to subject each generated view (31 to 34) to an edge extraction for determining at least one extracted edge (38, 39) in the respective view and means for determining which edges of the real object to be tracked are of relevance for said subsequent object tracking process; and,
   a means for transforming said edges (38, 39) extracted from the respective views (31 to 34) to a three-dimensional contour model (85, 91) corresponding to said data model.

24. A computer program product in a memory medium adapted to be loaded into the internal memory of a digital computer and comprising software code sections configured to:
   provide a three-dimensional CAD model (10) for representing a real object to be tracked in a subsequent object tracking process;
   generate different synthetic two-dimensional views (31 to 34) from said CAD model (10);
   subject each generated view (31 to 34) to edge extraction for determining at least one extracted edge (38, 39) in a respective view and determine which edges of the real object to be tracked are of relevance for said subsequent object tracking process; and,
   transform said at least one extracted edge (38, 39) extracted from said respective view selected from said respective views (31 to 34) to a three-dimensional contour model (85, 91) corresponding to a data model.

* * * * *